United States Patent
Mayr

Patent Number: 6,059,526
Date of Patent: May 9, 2000

[54] BRUSH SEAL

[75] Inventor: Alfred Mayr, Roehrmoos, Germany

[73] Assignee: MTU Motoren-und Turbinen-Union Muenchen GmbH, Munich, Germany

[21] Appl. No.: 09/180,252

[22] PCT Filed: Mar. 26, 1997

[86] PCT No.: PCT/EP97/01529

§ 371 Date: Nov. 6, 1998

§ 102(e) Date: Nov. 6, 1998

[87] PCT Pub. No.: WO97/42399

PCT Pub. Date: Nov. 13, 1997

[30] Foreign Application Priority Data

May 8, 1996 [DE] Germany .......................... 196 18 475

[51] Int. Cl.$^7$ ................................................. F16J 15/447
[52] U.S. Cl. ...................... 415/231; 415/173.3; 277/355
[58] Field of Search ................... 415/231, 230, 415/174.2, 174.3, 173.3; 277/355

[56] References Cited

U.S. PATENT DOCUMENTS

| | | | |
|---|---|---|---|
| 5,029,875 | 7/1991 | Spain et al. ................................. | 277/1 |
| 5,174,582 | 12/1992 | Ferguson .................................. | 277/53 |
| 5,400,586 | 3/1995 | Bagepalli et al. . | |
| 5,425,543 | 6/1995 | Buckshaw et al. . | |
| 5,474,306 | 12/1995 | Bagepalli et al. . | |
| 5,975,535 | 11/1999 | Gail et al. . | |

FOREIGN PATENT DOCUMENTS

| | | |
|---|---|---|
| 211275 | 2/1987 | European Pat. Off. . |
| 2140674 | 12/1984 | United Kingdom . |
| WO8605252 | 9/1986 | WIPO . |

*Primary Examiner*—Edward K. Look
*Assistant Examiner*—Rhonda Barton
*Attorney, Agent, or Firm*—W. F. Fasse; W. G. Fasse

[57] ABSTRACT

Brush seal for sealing two spaces of differing pressure (P1, P2) between a stator (20) and a rotor (10) of a turbomachine. The bristles (30) of the brush seal comprise angled bristle sections (31), of which the ends run against the seal surface of the rotor (10). In this manner, a low bristle stiffness and a low required radial structural space can simultaneously be achieved.

17 Claims, 1 Drawing Sheet

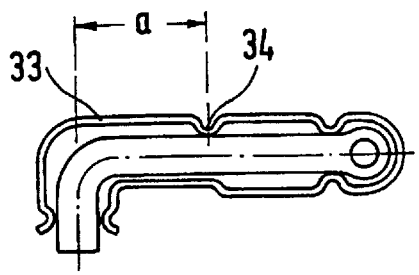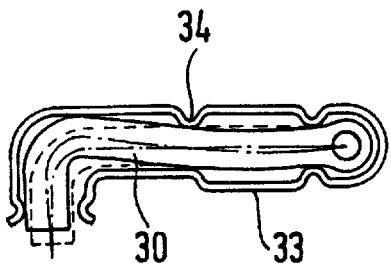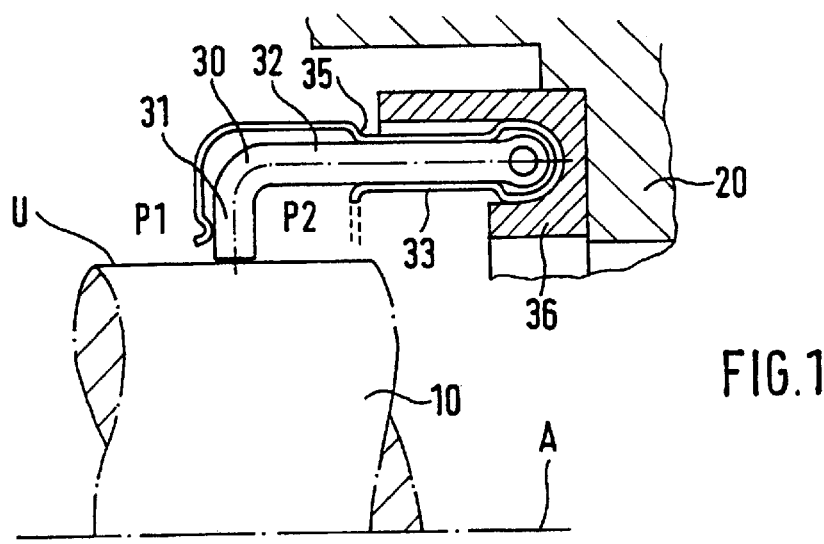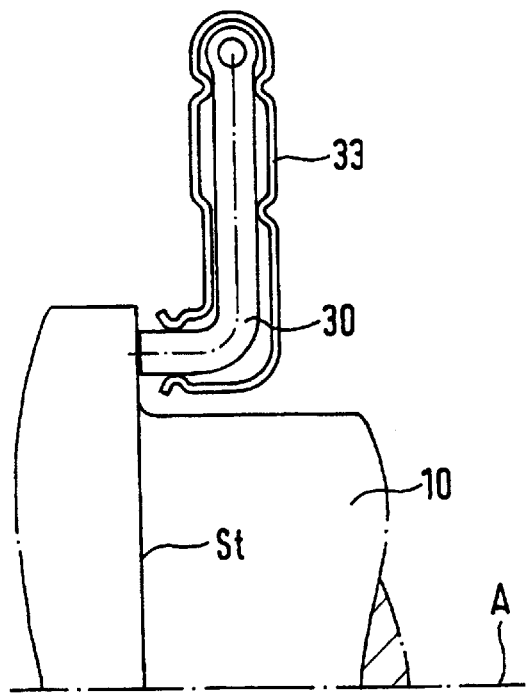

BRUSH SEAL

The invention relates to a brush seal for sealing two spaces of differing pressure between a stator and a rotor of a turbomachine.

Brush seals for turbomachines are known and have proven themselves as sealing means relative to other seal construction embodiments such as lip seals or labyrinth seals for example. A disadvantage of conventional brush seals is that a certain minimum radial extension of the entire arrangement of the brush seal is required due to a necessary bristle length, when it is desired to maintain the stiffness of the bristles within acceptable limits. Bristles that are too short and thus too stiff would attack the seal surface against which the ends run.

Thus, the object of the present invention is to provide a brush seal that enables a low bristle stiffness on the one hand, and requires only the smallest possible radial structural space on the other hand.

The presented object is achieved according to the invention in that the bristles of the brush seal comprise angled bristle sections of which the ends run against the seal surface of the rotor.

The brush seal according to the invention achieves the presented object in that the stiffness of the bristles can be set by a corresponding selection of the bristle shaft ends extending in the axial direction. Thereby it is possible to maintain the radial structural space for such a brush seal to be so small that a brush seal can be used without problems and without substantial changes of the rotor or the stator in applications in which previously a labyrinth seal was constructively provided.

Preferably, the angled bristle sections are shorter than the shaft sections of the bristles that are secured in a holding arrangement.

In order to set the bristle stiffness, a further embodiment of the invention provides a holding arrangement for the bristles, that comprises at least one stop or abutment perpendicularly to the extension of the bristles, of which the position with respect to the spacing from the bent or angled bristle sections is set or adjusted in such a manner that a desired spring characteristic of the elastic bristles is defined. The free bending length of the bristles and therewith the stiffness thereof is set or adjusted by means of the crimp beads or corrugations.

It is advantageous if the holding arrangement is embodied as a sheet metal housing and the stop or abutment is a crosswise extending crimp bead or corrugation in the sheet metal housing.

As an alternative to the embodiment of the bristle mounting as a sheet metal housing with crimp beads, an end edge of the holding arrangement can also be selected as the stop, whereby the bristles lie directly against this end edge, which thus determines the free bending length of the bristles.

Insofar as brush seals are to be used for sealing rotor side faces, a seal according to the invention is especially advantageous if only a slight axial structural space is available for sealing of a rotor side face. In this case, the brush seal with the right-angled bent bristle sections is embodied as an annular disk seal in which the angled bristle ends run against the rotor side face, while the shaft sections of the bristles are oriented essentially radially.

Example embodiments of the invention will be described in connection with the accompanying drawings, in which:

FIG. 1 shows a portion of a turbomachine in the area of a seal location with a brush seal in axial section;

FIG. 1a shows an alternative embodiment of a brush seal according to FIG. 1;

FIG. 1b shows the brush seal according to FIG. 1a with a radially deflected bristle bundle; and FIG. 2 shows the installed position of a brush seal corresponding to FIGS. 1 to 1b in cooperation with a side face seal surface of a rotor.

In the portion of a turbomachine shown in FIG. 1, a rotor is identified by 10 and a stator is identified by 20. Spaces of differing pressure P1, P2 between rotor 10 and stator 20 are sealed by means of a brush seal. The free ends of the bristles identified by 30 of the brush seal run against a circumferential surface U of the rotor 10. The brush seal is secured in a holding or mounting ring 36 and positioned therewith in the stator 20. The bristles 30 of the brush seal are bent or angled at approximately a right angle. The ends of the angled bristle sections 31 run against the circumferential seal surface U of the rotor 10. The shaft sections 32 of the bristles 30 are engaged in a holding arrangement, whereby this holding arrangement is embodied as a sheet metal housing 33 in the illustrated example embodiment. The shaft sections 32 of the bristles 30 are longer than the angled bristle sections 31. A stop or abutment 35 is provided on the sheet metal housing 33 perpendicularly to the extension of the shaft sections 32 of the bristles 30. This stop 35 acts as a bending edge when the bristles are deflected in the radial direction, for example due to an eccentricity of the rotor 10. The stop 35 can be embodied as a crimp bead or corrugation 34 in the sheet metal housing 33, which is shown in FIG. 1a. The position of the stop 35 or the crimp bead 34 on the sheet metal housing 33 is selected so that the spacing a (see FIG. 1a) to the bent bristle sections 32 of the brush seal defines a desired spring characteristic of the elastic bristles 30. Thereby the stiffness of the bristles and the contact pressure of the bristles on the seal surface U of the rotor can be set or adjusted within limits, without thereby requiring an unacceptably large radial structural space.

The radial deflection of the bristles 30 and their bending about the crimp bead 34 is shown in FIG. 1b. The stop 35 for the bristles 30 can be embodied as an end edge of the sheet metal housing 33. In the illustrated embodiment, the sheet metal housing 33 is extended further toward the front in the direction of the angled bristle sections 31, in order to guide the forward portion of the bristles, and in an applicable case also to protect the forward portion of the bristles against an aggressive environment (temperature).

The seal location shown in FIG. 2 comprises a brush seal of the construction according to FIG. 1a having a sheet metal housing 33 and bristles 30. The radially oriented seal surface is a difference relative to the seal according to FIG. 1, whereby this seal surface is identified as a side face St. The angled bristle sections 31 run against this side face St. The rotor axis of the rotor 10 is identified by A, as also in FIG. 1.

What is claimed is:

1. A brush seal for providing a seal between a stator and a rotor of a turbomachine to separate two spaces of differing pressure, said brush seal comprising a housing and a plurality of seal bristles that are arranged and held at least partially in said housing and that each respectively comprise an elastic flexible bristle shaft section, an angled bristle section and a bend elbow therebetween, wherein each said bristle shaft section includes at least a first portion that is held in said housing, each said angled bristle section has a free end that protrudes out of said housing and is adapted to sealingly contact a seal surface of the stator or the rotor of the turbomachine, and each said bend elbow comprises an approximately right angle bend such that said angled bristle section extends at approximately a right angle relative to said bristle shaft section.

2. The brush seal according to claim 1, wherein each said bend elbow comprises a right angle bend such that said angled bristle section extends at a right angle relative to said bristle shaft section.

3. The brush seal according to claim 1, wherein each said angled bristle section is shorter than each said bristle shaft section.

4. The brush seal according to claim 1, wherein said housing includes at least one stop that extends perpendicularly to an extension direction of each said bristle shaft section and that contacts and supports at least a supported part of said first portion of each said bristle shaft section.

5. The brush seal according to claim 4, wherein said stop is located at a location along said bristle shaft section displaced away from said angled bristle section by a spacing distance that determines a resulting spring characteristic of said bristles.

6. The brush seal according to claim 4, wherein said housing comprises a formed sheet metal housing wall, and wherein said stop comprises a crimp bead or corrugation of said sheet metal housing wall that protrudes toward and into contact with said supported part of said first portion of each said bristle shaft section and that extends perpendicularly to said extension direction of each said bristle shaft section.

7. The brush seal according to claim 6, wherein said formed sheet metal housing wall further includes a clamping portion that clampingly holds a respective fixed end of each said bristle shaft section, and said formed sheet metal housing wall further includes a non-contacting portion that extends between said stop and said clamping portion and that is spaced away from and not in contact with an unsupported part of said first portion of each said bristle shaft section, which extends between said supported part and said fixed end of said bristle shaft portion.

8. The brush seal according to claim 4, wherein said stop extends along, contacts, and supports the entirety of said first portion of each said bristle shaft section, and said stop terminates at an end edge that is spaced apart from each said angled bristle section by a spacing distance along each said bristle shaft section.

9. The brush seal according to claim 8, wherein said housing further includes a clamping portion that clampingly holds a respective fixed end of each said bristle shaft section, and said stop of said housing clampingly holds the entirety of said first portion of each said bristle shaft portion between said end edge and said clamping portion.

10. The brush seal according to claim 4, wherein each said bristle shaft section further includes a deflectable unsupported second portion extending from said supported part of said fist portion to said bend elbow, and wherein said second portion is unsupported and not in contact with said housing and is deflectable in a direction that is transverse relative to said extension direction of said bristle shaft section and along an extension direction of said angled bristle section.

11. The brush seal according to claim 10, wherein said stop is a fixed rigid bending edge at which said bristle shaft section elastically bends when said second portion is deflected.

12. The brush seal according to claim 10, wherein said housing further includes an extension that extends from a location of said stop along said second portion, said bend elbow and at least a part of said angled bristle section of each said bristle without contacting said second portion and without contacting said bend elbow.

13. The brush seal according to claim 12, wherein said housing further includes a guide lip at an edge of said extension of said housing, and wherein said guide lip slidingly contacts said angled bristle section adjacent said free end thereof.

14. The brush seal according to claim 1, further in combination with said turbomachine including said rotor and said stator, wherein said brush seal is arranged such that each said bristle shaft section extends in a direction parallel to a rotation axis of said rotor and each said angled bristle section extends in a radial direction with respect to said rotor.

15. The brush seal according to claim 1, further in combination with said turbomachine including said rotor and said stator, wherein said brush seal is arranged such that each said angled bristle section extends in a direction parallel to a rotation axis of said rotor and each said bristle shaft section extends in a radial direction with respect to said rotor.

16. A brush seal for sealing two spaces of differing pressure between a stator and a rotor of a turbomachine, comprising a plurality of seal bristles and a holding arrangement for said bristles, wherein said bristles respectively comprise shaft sections and angled bristle sections having ends adapted to run against a seal surface of the rotor, and wherein said holding arrangement comprises a sheet metal housing that includes a crosswise extending crimp bead, which forms a stop extending perpendicularly to an extension direction of said bristles and having a position spaced from said angled bristle sections so as to define a spring characteristic of said bristles.

17. A turbomachine including a stator, a rotor that is rotatable relative to said stator, and a brush seal that is arranged between said rotor and said stator for sealing two spaces of differing pressure, wherein said brush seal comprises a plurality of seal bristles that respectively comprise bristle shaft sections and angled bristle sections having free ends in sliding contact with a seal surface of said rotor, wherein said brush seal is arranged such that said bristle shaft sections extend in a direction parallel to a rotation axis of said rotor and said angled bristle sections extend radially relative to said rotor.

* * * * *

UNITED STATES PATENT AND TRADEMARK OFFICE
CERTIFICATE OF CORRECTION

PATENT NO. : 6,059,526
DATED : May 9, 2000
INVENTOR(S) : Mayr

It is certified that error appears in the above-identified patent and that said Letters Patent is hereby corrected as shown below:

Title Page:
Item [54], after "BRUSH SEAL", insert --WITH ANGLED SEALED BRISTLES--;
Item [57] replace the ABSTRACT to read:
--A brush seal for sealing two spaces of differing pressure (P1, P2) between a stator (20) and a rotor (10) of a turbomachine. The bristles (30) of the brush seal comprise bristle shaft sections (32) and angled bristle sections (31), of which the ends run against the seal surface of the rotor (10). A holding arrangement holds at least a part of each bristle shaft section while allowing another part of each bristle shaft section to deflect so that the angled bristle section can move yieldingly in a direction along its extension direction. In this manner, a low bristle stiffness and a low required radial structural space can simultaneously be achieved.--;

Please replace Column 1 to read as follows:

-- BRUSH SEAL WITH ANGLED SEAL BRISTLES

FIELD OF THE INVENTION

The invention relates to a brush seal for sealing two spaces of differing pressure between a stator and a rotor of a turbomachine with bristles that comprise angled bristle sections of which the ends run against the seal surface of the rotor.

BACKGROUND INFORMATION

Brush seals for turbomachines are known and have proven themselves as sealing means relative to other seal construction embodiments such as lip seals or labyrinth seals for example. A disadvantage of conventional brush seals is that a certain minimum radial extension of the entire arrangement of the brush seal is required due to a necessary bristle length, when it is desired to maintain the stiffness of the bristles within acceptable limits. Bristles that are too short and thus too stiff would attack the seal surface against which the ends run.

UNITED STATES PATENT AND TRADEMARK OFFICE
CERTIFICATE OF CORRECTION

PATENT NO. : 6,059,526
DATED : May 9, 2000
INVENTOR(S) : Mayr

It is certified that error appears in the above-identified patent and that said Letters Patent is hereby corrected as shown below:

Column 1, Continued:

A brush seal of the above mentioned type of construction having angled bristle sections is known from U. S. Patent 5,474,306, Fig. 8. In the above mentioned seal, the respective sections of the bristles by which they are secured in a holding arrangement, are held to such an extent that only the angled bristle sections are elastically deformable. Thus, in this regard the angled embodiment of the bristles cannot lead to a different bending characteristic of the bristles relative to straight embodied brush seals.

From British Patent 2,140,674, a brush seal with angled bristles is known, in which both bristle sections are freely bendable. Thereby the advantage is achieved, that the stiffness of the bristles can be maintained within limits, and yet a slight deflection of the bristles is possible with a corresponding movement of the rotor surface that is to be sealed.

SUMMARY OF THE INVENTION

In view of the above, an the object of the present invention is to provide a brush seal of the above mentioned general type that enables a low bristle stiffness on the one hand, and requires only the smallest possible radial structural space on the other hand. Particularly the invention aims to provide a simple structural arrangement that sets the free bending length of the bristle section that is secured in the holding arrangement of the brush seal.

The above object is achieved according to the invention in that the bristles of the brush seal comprise angled bristle sections of which the ends run against the seal surface of the rotor, and in that a holding arrangement is provided for the bristles as described below. The stiffness of the bristles can be set by a corresponding selection of the bristle shaft ends extending in the axial direction. Thereby it is possible to maintain the radial structural space for such a brush seal to be so small that a brush seal can be used without problems and without substantial changes of the rotor or the stator in applications in which previously a labyrinth seal was constructively provided.

UNITED STATES PATENT AND TRADEMARK OFFICE
CERTIFICATE OF CORRECTION

PATENT NO. : 6,059,526
DATED : May 9, 2000
INVENTOR(S) : Mayr

Page 3 of 5

It is certified that error appears in the above-identified patent and that said Letters Patent is hereby corrected as shown below:

Column 1, Continued:

Preferably, the angled bristle sections are shorter than the shaft sections of the bristles that are secured in the holding arrangement. In order to set the bristle stiffness, the holding arrangement for the bristles comprises at least one stop or abutment perpendicularly to the extension of the bristles, of which the position with respect to the spacing (a) from the bent or angled bristle sections is set or adjusted in such a manner that a desired spring characteristic of the elastic bristles is defined. The spacing (a) to the bent bristle sections is definitive for the positioning of the stop or abutment, because thereby the spacing distance from the starting or running contact point of the bristle ends against the seal surface of the rotor is defined. The free bending length of the bristles and therewith the stiffness thereof is set or adjusted by means of crimp beads or corrugations of the holding arrangement. It is advantageous if the holding arrangement is embodied as a sheet metal housing and the stop or abutment is a crosswise extending crimp bead or corrugation in the sheet metal housing.

As an alternative to the embodiment of the bristle mounting as a sheet metal housing with crimp beads, an end edge of the holding arrangement can also be selected as the stop, whereby the bristles lie directly against this end edge, which thus determines the free bending length of the bristles.

Insofar as brush seals are to be used for sealing rotor side faces, a seal according to the invention is especially advantageous if only a slight axial structural space is available for sealing of a rotor side face. In this case, the brush seal with the right-angled bent bristle sections is embodied as an annular disk seal in which the angled bristle ends run against the rotor side face, while the shaft sections of the bristles are oriented essentially radially.

BRIEF DESCRIPTION OF THE DRAWINGS

Example embodiments of the invention will be described in connection with the accompanying drawings, in which:

Fig. 1    shows a portion of a turbomachine in the area of a seal location with a brush seal in axial section;

Fig. 1a    shows an alternative embodiment of a brush seal according to Fig. 1;--;

UNITED STATES PATENT AND TRADEMARK OFFICE
CERTIFICATE OF CORRECTION

PATENT NO. : 6,059,526
DATED : May 9, 2000
INVENTOR(S) : Mayr

It is certified that error appears in the above-identified patent and that said Letters Patent is hereby corrected as shown below:

Column 2:
Please replace lines 1 to 51 of Col. 2 to read as follows:
--Fig. 1b shows the brush seal according to Fig. 1a with a radially deflected bristle bundle; and Fig. 2 shows the installed position of a brush seal corresponding to Figs. 1 to 1b in cooperation with a side face seal surface of a rotor.

DETAILED DESCRIPTION OF PREFERRED EXAMPLE EMBODIMENTS OF THE INVENTION

In the portion of a turbomachine shown in Fig. 1, a rotor is identified by 10 and a stator is identified by 20. Spaces of differing pressure P1, P2 between rotor 10 and stator 20 are sealed by means of a brush seal. The free ends of the bristles identified by 30 of the brush seal run against a circumferential surface U of the rotor 10. The brush seal is secured in a holding or mounting ring 36 and positioned therewith in the stator 20. The bristles 30 of the brush seal are bent or angled at approximately a right angle. The ends of the angled bristle sections 31 run against the circumferential seal surface U of the rotor 10. The shaft sections 32 of the bristles 30 are engaged in a holding arrangement, whereby this holding arrangement is embodied as a sheet metal housing 33 in the illustrated example embodiment. The shaft sections 32 of the bristles 30 are longer than the angled bristle sections 31. A stop or abutment 35 is provided on the sheet metal housing 33 to extend perpendicularly and circumferentially relative to the extension of the shaft sections 32 of the bristles 30. This stop 35 acts as a bending edge when the bristles are deflected in the radial direction, for example due to an eccentricity of the rotor 10.

The stop 35 can be embodied as a crimp bead or corrugation 34 in the sheet metal housing 33, which is shown in Fig. 1a. The position of the stop 35 or the crimp bead 34 on the sheet metal housing 33 is selected so that the spacing a (see Fig. 1a) from the stop 35 or crimp bead 34 to the extension axis of the bent bristle sections 32 of the brush seal defines a desired spring characteristic of the elastic bristles 30. Thereby the stiffness of the bristles and the contact pressure of the bristles on the seal surface U of the rotor can be set or adjusted within limits, without thereby requiring an unacceptably large radial structural space.

UNITED STATES PATENT AND TRADEMARK OFFICE
CERTIFICATE OF CORRECTION

PATENT NO. : 6,059,526
DATED : May 9, 2000
INVENTOR(S) : Mayr

It is certified that error appears in the above-identified patent and that said Letters Patent is hereby corrected as shown below:

Column 2, Continued:

The radial deflection of the bristles 30 and their bending about the crimp bead 34 is shown in Fig. 1b. The stop 35 for the bristles 30 can be embodied as an end edge of the sheet metal housing 33. In the illustrated embodiment, the sheet metal housing 33 is extended further toward the front in the direction of the angled bristle sections 31, in order to guide the forward portion of the bristles, and in an applicable case also to protect the forward portion of the bristles against an aggressive environment (temperature). At least one guide lip of the extending portion of the housing contacts at least one side of the angled bristle sections 31 to support and guide the angled bristle sections.

The seal arrangement shown in Fig. 2 comprises a brush seal of the construction according to Fig. 1a having a sheet metal housing 33 and bristles 30. The radially oriented seal surface is a difference relative to the seal according to Fig. 1, whereby this seal surface is identified as a side face St of the rotor 10. The angled bristle sections 31 run against this side face St. The rotor axis of the rotor 10 is identified by A, as also in Fig. 1.--;

Signed and Sealed this

Seventh Day of August, 2001

*Attest:*

*Attesting Officer*

NICHOLAS P. GODICI
*Acting Director of the United States Patent and Trademark Office*